Oct. 5, 1926.
M. A. POSSONS
1,602,206
GAS VALVE FOR SUPPLYING GAS TO BURNERS
Filed April 12, 1926
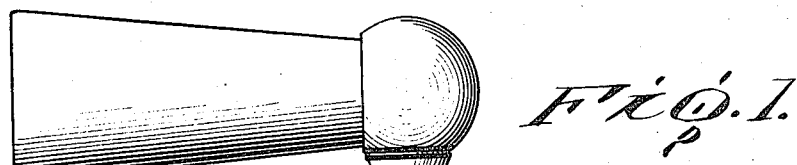
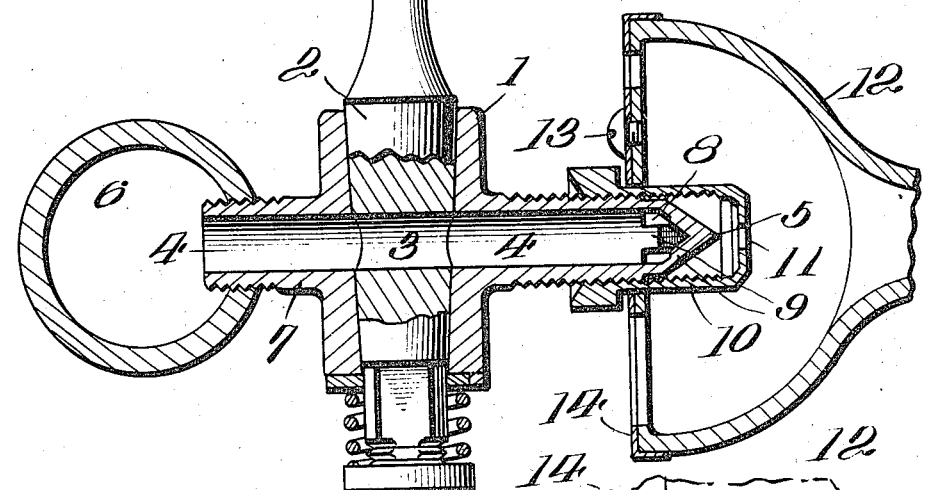
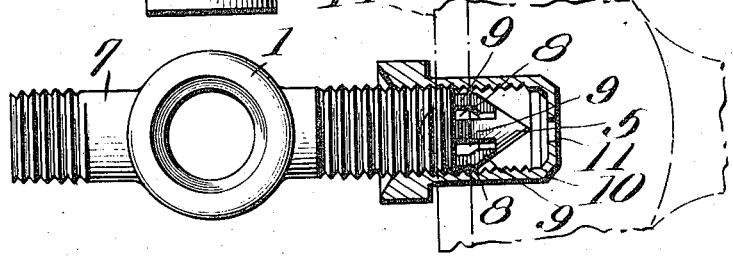
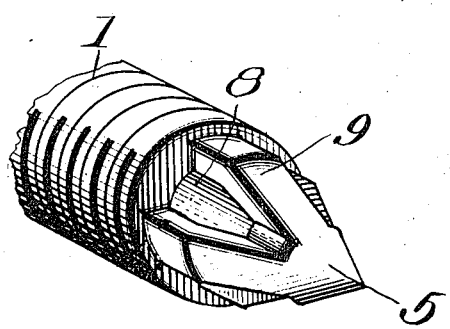

Patented Oct. 5, 1926.

1,602,206

UNITED STATES PATENT OFFICE.

MINARD A. POSSONS, OF CLEVELAND, OHIO, ASSIGNOR TO AMERICAN STOVE COMPANY, OF ST. LOUIS, MISSOURI, A CORPORATION OF NEW JERSEY.

GAS VALVE FOR SUPPLYING GAS TO BURNERS.

Application filed April 12, 1926. Serial No. 101,564.

This invention relates to improvements in gas valves for supplying gas to burners.

The invention herein pertains particularly to a pointed or needle shape valve through which gas is fed to an adjustable nipple having an opening with which the pointed valve cooperates for controlling the passage of gas therethrough.

It is common to provide a pointed valve with gas passages by drilling a number of openings, usually four, through the valve laterally, the inner ends of the openings communicating with the fuel supply opening. For a long time it has been known that a pointed valve having these laterally extending openings has fed the gas to the nipple in a manner to prevent it from producing a good burning mixture of air and gas within the succeeding mixing chamber. Briefly this is due to the fact that the gas flows laterally against the walls of the nipple in a fan shape and as a consequence, flows from the nipple opening in fan shape and strikes the walls of the mixing chamber, tending to cause backward pressure on the gas in the mixing chamber, which retards the inward flow of air for mixing with the gas, as will be fully set forth in detail hereinafter.

Great difficulty has been found in trying to form openings in a pointed valve that pass longitudinally in direct communication with the fuel supply opening, and because no practical way has been found to drill openings in the pointed valve that extended longitudinally with the fuel supply opening. As a consequence, pointed valves so far as I am aware, have heretofore been used with the laterally drilled openings that causes the disadvantageous result above referred to.

After long experimentation with this problem, I have finally succeeded in forming openings through this pointed valve which communicate in a longitudinal direction directly with the fuel supply opening or conduit of the hand valve whereby I have been enabled to cause the gas to feed from the pointed valve in a line with the axis of said fuel supply conduit, and as a consequence, the gas flows directly from the said openings through the nipple opening and does not form in fan shape, and does not have any tendency for back pressure in the mixing chamber, but to the contrary causes a strong inward pull of air so that an ample supply of air is furnished for mixture with the gas.

In solving this problem I have formed openings in the pointed or tapered valve, the openings in cross section being substantially at right angles and elongated in a direction parallel to the axis and having direct communication with the fuel conduit of the hand valve. These openings are four in number, whereby ample supply of gas is provided for nipples having various sized outlet openings. The said openings are therefore elongated in a direction longitudinal the fuel supply conduit which openings are preferably right angular in cross section.

I have been enabled after a series of efforts, to form these longitudinally extending openings having their inner ends in direct communication with the fuel supply conduit by die casting the pointed valve, its openings and the whole hand control structure. I find that it is impossible to cast these openings in an ordinary manner, that is by means of a temporary mold.

In the accompanying drawings:

Figure 1 is an enlarged, vertical, central, sectional view of a valve housing, a tapered valve and its nipple that involves my present improvement.

Figure 2 is an enlarged top view of the housing and the pointed valve, with the nipple and the mixing chamber in section.

Figure 3 is a greatly enlarged perspective view of my improved tapered valve showing in detail the construction of my improved openings made therein.

My improved or tapered valve is adapted for use in connection with any form of hand valve, but I show it in use here with a housing 1, said housing having placed therein a hand valve 2 having a fuel passage 3 that controls the flow of gas through the supply conduit 4 that is in communication with my improved pointed valve 5. In the drawing a manifold 6 is shown into which an externally screw threaded arm 7 on the housing 1 is ordinarily screwed. Thus far I have described what is common in valves of this construction.

My improvement pertains particularly to the openings in the valve 5 that communicate with the fuel passageway 4. As shown these openings 8 are formed in a direction that extends longitudinally inward and communicates directly with the fuel passage 4. These openings 8 are as shown in Figure 1 approximately right angular in cross section. In forming these openings I connect the pointed valve 5 with the wall of the passage 4 by longitudinally extending ribs or members 9. In the form here shown of carrying out my improvement there are four openings 8 and as a consequence, there are four ribs 9. These ribs are cast integral with the wall of the fuel opening 4, and the pointed valve 5 is integral with the outer ends of the ribs 9.

Used in connection with the pointed valve 5 is a nipple 10 which screws upon and embraces the wall of the fuel opening 4, the said nipple having in its outer wall an opening 11. The nipple therefore is adjustable in respect to the point of the valve 5 for controlling the flow of gas through that central opening.

It will be understood that the opening 11 varies in size from approximately $\frac{1}{16}$ of an inch in diameter to approximately $\frac{3}{16}$ of an inch in diameter.

By means of this special construction of formation of the valve 5 with the specially constructed elongated openings 8 that communicate directly with the fuel passageway 4, the gas flows directly into the nipple 10 and does not strike its side walls as it flows from these openings, nor does the gas when it passes from the opening 11 move in a fan shaped form and strike the side walls of the mixing chamber 12 that encloses the nipple 10. As is well understood in this art, air flows into the mixing chamber 12 through a plurality of openings 13 which are controlled by an adjustable member 14. As a consequence, in practical operation my improved pointed valve with the longitudinal openings communicating directly with the fuel passage 4, makes a very much better mixture and does not have a tendency to back up in the mixing chamber 12 and therefore does not impede nor tend to impede the flow of air to the mixing chamber. It will be understood that it is essential that the air be entrained into the mixing chamber without any backward retarding action whatever in order to get sufficient air and in order to make a good mixture of the gas and air to be burned.

For the purpose of making my present invention appreciated and understood as compared to the well-known structure now in use, the old structure is shown in Figure 4. In this view it will be observed that the fuel passageway 15 extends into the pointed valve 16, and then four openings 17 are laterally drilled in communication with the fuel passageway 15. As a consequence, the gas in passing through these openings, strikes the side walls 18 of the nipple 10 directly first, and after swirling around therein, then flows through the opening 21 of the nipple and as a consequence, the gas flows outward from the opening 21 in substantially a fan shape having tendency and at times considerable tendency of back pressure in the mixing chamber 12 and therefore causes a back pressure on the air flowing to the mixing chamber.

The improvement here shown has been the result of efforts extending over a long time, to overcome this action of back pressure in the mixing chamber and to prevent the gas striking the side walls of the nipple as it flows from the openings in the pointed valve, which I have finally accomplished. The improved result of this accomplishment is readily noticeable by those skilled in the art and therefore this step is quite a large step forward in the proper feeding of gas upon a proper mixture with it of air and giving the result hereinbefore described.

I desire it to be understood that the walls of the ribs 9 may be rounded or otherwise shaped, but this will not change the substantial right angular formation that is referred to in the specific appended claims.

I find that in order to form my improved pointed valve, it is essential that it be die cast, and that the die have its parts shaped with projections that form the said openings 8 and cavities to form the ribs 9. By using a die casting so constructed, I have a permanent mold that cannot vary in its result, and by using a die casting specifically constructed as started, the result is a pointed valve of the construction hereinbefore referred to.

Variations in detail from those herein described can be made without departing from the invention so long as the changed construction is within a fair scope of the appended claims.

Having thus described my invention, what I claim and desire to secure by Letters Patent is:

1. An improved pointed valve having longitudinal passageways cut through the extended pointed end forming longitudinally extending tapered ribs for the purpose described.

2. An improved pointed valve having longitudinal passageways cut through the extended pointed end forming longitudinally extending tapered ribs having their outer ends stopping just back of the extreme point thereof for the purpose specified.

3. An improved valve comprising a hollow member having a pointed end, said pointed end having longitudinal passageways cut therethrough forming longitudinal tapered ribs, said passageways being in direct communication with the hollow portion for the purpose specified.

4. An improved valve comprising a hollow member having its end tapered, the tapered part of the hollow member having longitudinal openings communicating with the interior thereof and forming longitudinal ribs in the pointed portion of the valve and a nipple surrounding the said pointed end having an opening, the parts adapted to operate as described.

In testimony whereof I hereunto affix my signature.

MINARD A POSSONS.